June 1, 1948. E. B. HEATHCOTT 2,442,687
PACKING FOR STUFFING BOXES
Filed July 13, 1945

Inventor
E. B. HEATHCOTT
By J. Vincent Martin
Ralph C. Browning
Attorneys

Patented June 1, 1948

2,442,687

UNITED STATES PATENT OFFICE 2,442,687

PACKING FOR STUFFING BOXES

E. B. Heathcott, Houston, Tex., assignor to Universal Packing & Gasket Company, Houston, Tex., a corporation of Texas Application July 13, 1945, Serial No. 604,843

1 Claim. (Cl. 288—5)

This invention relates to an improvement in packings.

This invention relates to a packing which may be fitted around a tube or shaft passing through a wall, and which is fitted tightly around the tube or shaft within a conventional stuffing box which may be made integral with the wall surrounding the opening therein so that no leakage between the wall and the tube or shaft can occur. The form taken by the packing-rings adapted to be interposed between the internal periphery of the stuffing box and the periphery of the tube or shaft is preferably substantially V-shaped in cross-section, so that the packing-rings may fit tightly within the stuffing box and around the shaft or tube and yet of such a structure that the packing-rings will not be easily crushed by tightening of the gland.

An object of the invention is to provide a packing which will properly seal the space between a tube or shaft passing through a stuffing box in a wall.

A further object is to provide packing-rings made substantially V-shaped in cross-section, which rings may be positioned between the internal periphery of a stuffing box and the periphery of a shaft or tube passing through the stuffing box.

A still further object of the invention is to provide packing-rings which are substantially V-shaped in cross-section, and which rings may be placed between the internal periphery of a stuffing box and the periphery of a tube or shaft passing through the stuffing box, and which rings may not be collapsed by pressure of fluid attempting to pass outwardly along the shaft or tube.

Other objects and advantages will become apparent from the following description taken in connection with the accompanying drawing, wherein certain embodiments are set forth by way of illustration and example, but not by way of limitation.

Figure 1:
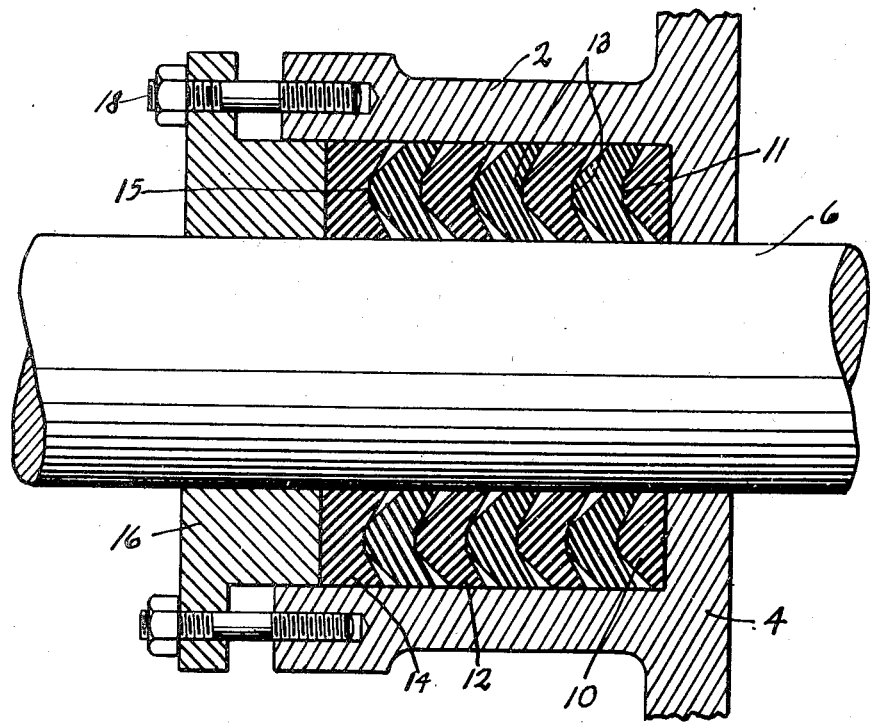
Figure 2:
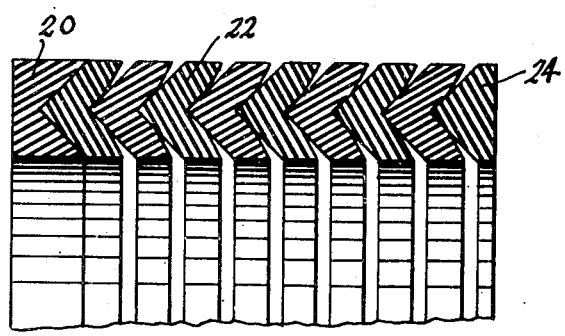

In the accompanying drawings:

Fig. 1 is a vertical cross-section through a stuffing box made integral with a wall or the like, and having packing-rings constructed in accordance with this invention in place therein; and Fig. 2 is a vertical cross-section through a plurality of modified rings, partly broken away.

The stuffing box 2 is made integral with a wall 4 through which a shaft (or tube) 6 is adapted to pass.

Within the stuffing box 2, V-shaped lip-type packing-rings are placed, which rings are shaped and proportioned so that their outer extremities bear against the internal periphery of the stuffing box 2, and so that their inner extremities bear against the periphery of the shaft or tube 6. Preferably the first ring 10, which is substantially triangular in cross-section and bears on its external periphery against the internal periphery of the stuffing box 2, and on its internal periphery against the periphery of the shaft or tube 6, is provided with one flat face, which will fit tightly against the bottom of the stuffing box 2. The other face of the ring 10 is provided with a V-shaped annular ridge or projection having a flat radial apex 11. The next succeeding rings 12, the inner and outer edges of which are adapted to bear against the periphery of the shaft 6 and the internal periphery of the stuffing box 2, respectively, are substantially V-shaped in cross-section with their inner and outer edges of less axial thickness than their central portions, and with their central portions formed with flat radial parallel surfaces 13 lying in parallel planes transverse to the ring axis, for bearing engagement with corresponding parts of the next adjacent rings, as shown in Fig. 1. When positioned within the stuffing box 2 and around the pipe 6, the apex of each V-shaped ring 12 is positioned substantially in alignment with the apex of and in engagement with the bottom of the groove or hollow of the next succeeding ring 12, while the lip portions of successive rings are spaced from each other. The surfaces of the lip portions or arms of the V, when viewed in cross section, are formed along straight lines converging from the thickened central or apex portion of the ring providing thin edge portions at the extremities of the lip portions. The surfaces of the lip portions, on the hollow side of the ring, terminate at their juncture with the lip extremities in sharp feather edges.

After a plurality of rings 12 have been positioned around the periphery of the pipe 6 within the stuffing box 2, a ring 14 which has an annular groove with a flat bottom 15 in one face and a substantially radial surface on its other face is positioned so that such flat bottom 15 contacts the corresponding bearing surface of the apex of the ridge or projection on the next preceding V-shaped ring 12, and is substantially in alignment with the apices of the preceding V-shaped rings 12. After the aforementioned rings have been positioned within the stuffing box 2 and surrounding the shaft 6, a suitable gland ring 16 is placed in contact with the base or flat side of the ring 14 and is forced toward the interior of the stuffing box 2 by means of conventional studs 18, to secure the packing rings firmly in place. The stack height of the packing rings, in this instance is the same as the thickness of the central portion between surfaces 13, is less than the dimension of the annular space to be packed, known as the packing dimension. This permits packing of several rings within a short stuffing box or the like.

With this construction, the plurality of packing-rings will be positioned as described above, so that the internal lips of the rings 10, 12 and 14 will be in contact with the periphery of the shaft 6, and the external lips of the rings 10, 12 and 14 will contact the internal periphery of the stuffing box 2. By tightening the studs 18, the gland ring 16 may be drawn tightly against the ring 14 which in turn would bring pressure to bear against the next preceding V-shaped ring 12. Each adjacent V-shaped ring 12 will bear against the wide bearing zone of the center portion of its preceding ring, but by reason of the limited centrally located zone of its contact, will not force the lips of the V-shaped rings outwardly and tightly against each other. Because of this construction, even an excessive pressure applied by tightening the studs 18, the packing-rings will not be completely collapsed, and the spaces between their edges or lips will remain open substantially from the central thickened section to the extremities of the lips, to receive pressure fluid adapted to hold such edges or lips in sealing engagement with the stuffing box and shaft.

It will be understood that by the use of V-shaped packing-rings, the greater the pressure differential sealed against, the more tightly the edges of the packing-rings will be forced against the surfaces which they are adapted to contact and embrace.

It will be obvious from the disclosure of the substantially V-shaped packing rings that those disclosed in Fig. 1 are provided with a relatively flat apex, whereas the modified rings 20, 22, and 24 disclosed in Fig. 2 have definite angular apices. Each, however, provides rings shaped to provide a limited bearing zone between adjacent rings while leaving the lips or edges thereof free and slightly spaced from each other.

While Fig. 1 of the drawings discloses a packing gland positioned around a shaft 6, it will be understood that the element 6 could equally well be a tube around the external periphery of which no leakage would be permitted, and the term shaft as herein used is not intended to exclude a tubular member.

Having described my invention, I claim:

A packing ring comprising a web of resilient material substantially V-shaped in cross section to permit stacking of a plurality of said rings when used and having a central apex portion substantially thicker than the lip portions and thin edge portions at the extremities of the lip portions, the packing dimension of the ring being greater than its stack height, the central thickened portion having faces lying in parallel planes transverse to the ring axis to provide mating central annular seat surfaces between adjacent rings, for transmitting axial forces between rings without distorting the lip portions thereof in operation, the surfaces of the said lip portions, viewed in cross-section, converging along straight lines from the thickened central portion, the surfaces of the lip portions on the hollow side of the V terminating in feather edges at their junctures with the lip extremities whereby upon installation spaces are provided between edge portions of adjacent rings from the thickened portion to the lip edges, said spaces adapted to accommodate lubricant and serve as pressure chambers.

E. B. HEATHCOTT.

REFERENCES CITED

The following references are of record in the file of this patent:

UNITED STATES PATENTS

| Number | Name | Date |
|---|---|---|
| 1,035,279 | Walker | Aug. 13, 1912 |
| 1,246,089 | Greenoe | Nov. 13, 1917 |
| 2,284,340 | Nuckles | May 26, 1942 |
| 2,420,929 | Buffington et al. | May 20, 1947 |

FOREIGN PATENTS

| Number | Country | Date |
|---|---|---|
| 495,671 | Germany | 1930 |